UNITED STATES PATENT OFFICE.

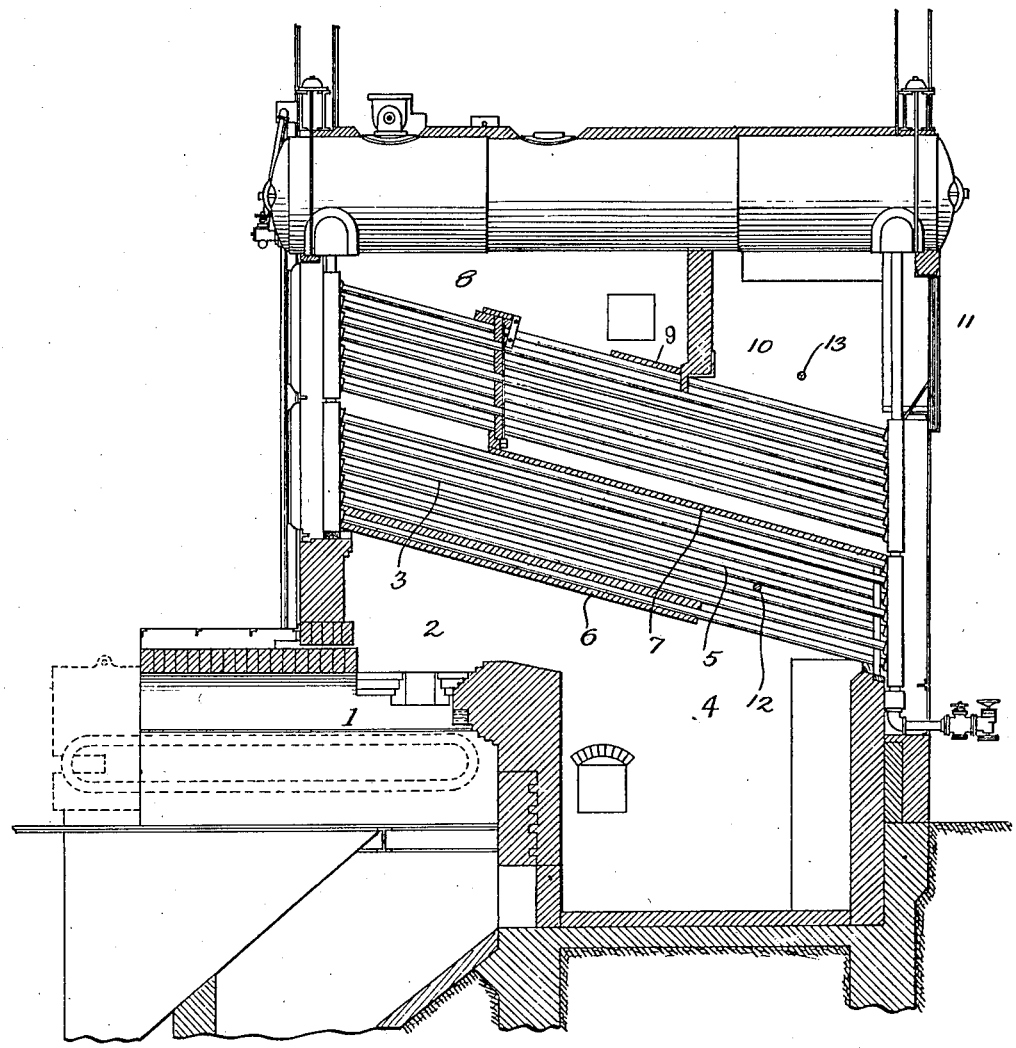

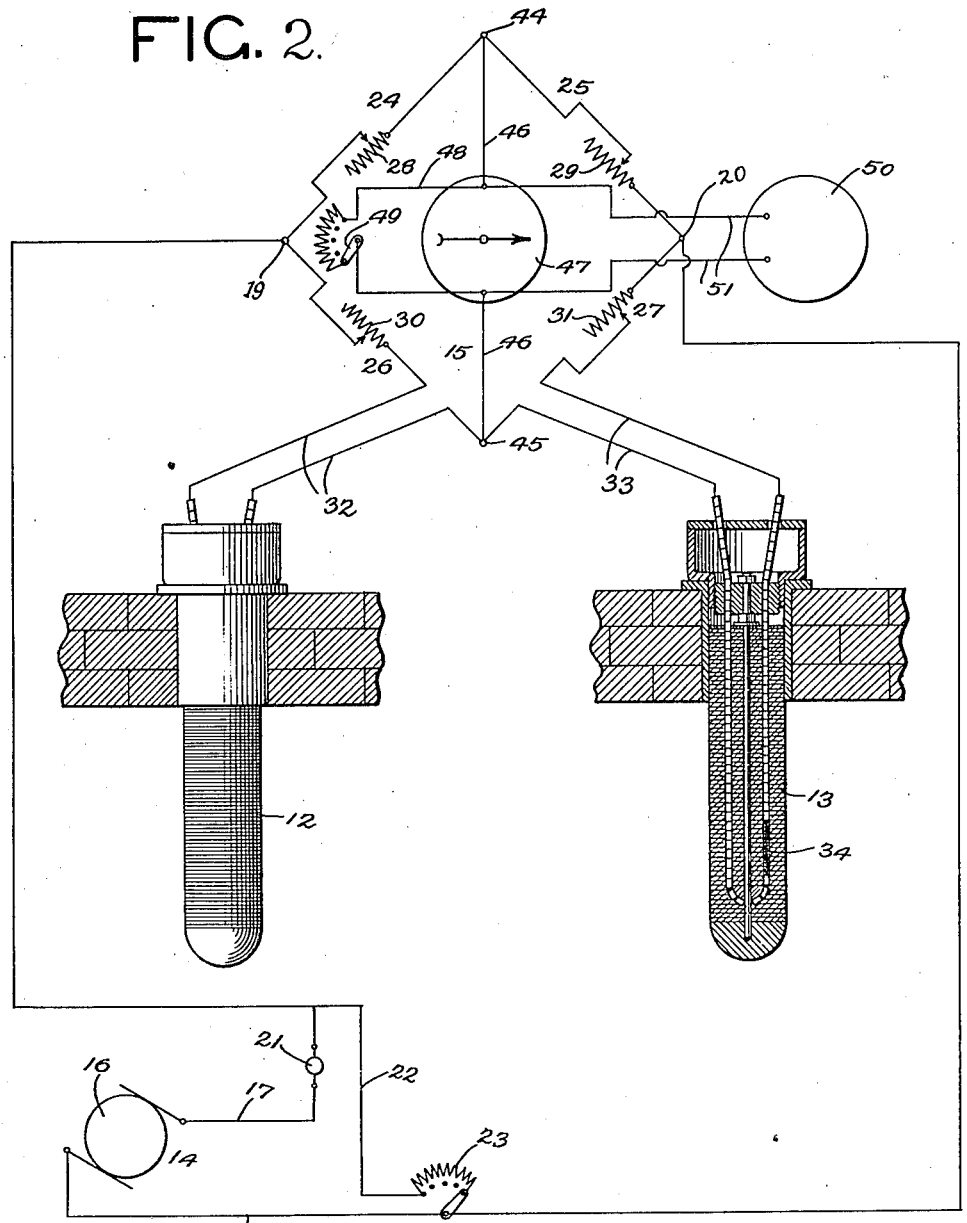

IRVEN H. WILSEY, OF CHICAGO, ILLINOIS, ASSIGNOR OF ONE-HALF TO WALTER H. GREEN AND ONE-HALF TO FRANK A. ADKINS, OF CHICAGO, ILLINOIS.

APPARATUS FOR INDICATING HEAT RATIOS.

1,206,968. Specification of Letters Patent. Patented Dec. 5, 1916.

Original application filed December 11, 1912, Serial No. 736,073. Divided and this application filed May 17, 1915. Serial No. 28,556.

*To all whom it may concern:*

Be it known that I, IRVEN H. WILSEY, a citizen of the United States, residing at Chicago, in the county of Cook and State of Illinois, have invented certain new and useful Improvements in Apparatus for Indicating Heat Ratios, of which the following is a specification.

This invention relates to apparatus used for determining or comparing the ratio of the amount of heat contained in one substance to the amount of heat contained in some other substance, or in the same substance at some other time.

This application is a division of the application made by me on December 11, 1912, Serial No. 736,073, for Letters Patent of the United States for improvements in methods for determining heat ratios.

The object of the invention is to provide apparatus which may be applied in a simple manner to cases where it is desired to determine or compare the relative amounts of heat, and has particular reference to the determination of heat ratios, or to a comparison of heat ratios, in heat utilizing or other similar apparatus, where it is desired to have indicated, from time to time, or continuously, the working conditions of the apparatus, particularly with reference to its efficiency. It is to be understood, however, that the application of my invention is not necessarily confined to such heat utilizing apparatus and for such purposes; yet, for, the purpose of illustrating the invention, such application in this instance will be considered.

By heat utilizing apparatus I refer to any apparatus which utilizes heat energy for the purpose of transforming the energy into other forms of energy or for the purpose of performing work. Whenever any such apparatus is in operation heat energy is conveyed to the apparatus by means of some substance in the state of a gas, a liquid, or a solid, and the energy is received by the apparatus and is transformed into some other form of energy, or is used in performing work by means of the apparatus, the substance passing on from the apparatus with less energy. By measuring the amount of work performed by the apparatus, when the total amount of energy used is known, the efficiency of the apparatus may be determined. And in case of a boiler, the efficiency may be determined by taking the ratio of the heat energy used by the boiler to the heat energy delivered to the boiler by the gases. It is to be understood, however, that I refer now to the amount of heat and not to the temperature of the substance. As is well known, the amount of heat which a substance contains depends not only on the temperature but also upon the mass and the specific heat. My invention, however, takes into consideration this fact and by the use of the invention the result arrived at may be the ratio between certain amounts of heat rather than the ratio between certain temperatures; although as a part of my invention I provide means whereby the ratio between temperatures also may be determined, if desired. Considering the passage of hot gases through the boiler flues, for instance, the specific heat of the entering gas, because of its higher temperature, is unlike the specific heat of the gas that passes away from the apparatus. Under ordinary conditions the initial temperature of the gas will be in the neighborhood of 2500 degrees Fahrenheit, while the final temperature will be in the neighborhood of 500 degrees Fahrenheit, and the specific heat of the gas under the former condition, will be materially greater than under the latter condition. But the amount of heat contained by the gas in each case will be proportional to the product of the temperature and the specific heat; so that the product of the temperature and the specific heat in each case will give a proper basis for the ratio between the heat energy of the entering gas and the heat energy of the escaping gas, providing the masses are equal; and ordinarily with boilers substantially all of the gases which enter the flues pass away from the flues, so that the masses passing any two points, may be considered substantially equal. Hence one object of my invention is to provide apparatus for determining heat ratios by taking into consideration specific heats as well as temperatures of substances.

We may now consider the apparatus which I prefer in carrying out my invention. For the purposes of simplicity it will be well to confine, for the moment, the description of this apparatus to the determination of temperature ratios only and then to describe how the apparatus may be applied to the determination of heat ratios.

The high temperatures existing in furnaces and the hot gas passageways of boilers may be indicated by various means. Certain heat susceptible devices may be used for such purpose, for example, any suitable form of high temperature measuring instrument, such as an electric pyrometer. The heat susceptible members, or fire-ends of two pyrometers may be inserted in or adjacent to the hot gas passageways in the boiler, one near where the gas enters the boiler, and the other where it passes away from the boiler; the reading of the pyrometers may be taken at any time and under any such conditions as may be desired; and the ratio between the two temperatures may be thus determined. From this ratio by means hereinafter explained, the ratio between the amounts of energy per unit mass when entering and passing away from the boiler flues may be determined. The accompanying drawings illustrate apparatus of this nature which may be used in carrying out my invention when applied to a furnace and boiler.

Figure 1 of the drawings illustrates a common form of boiler with my heat susceptible devices applied thereto. Fig. 2 indicates diagrammatically an apparatus for determining temperature or heat ratios with reference to the boiler, which embodies features of my invention.

I have selected in this instance for the heat susceptible devices of my apparatus electrical fire-ends placed in the hot gas passageway of a boiler and provide means for passing a current of electricity through the electrical conductors of the devices. As the resistance of a conductor depends upon its temperature, and the amount of current flowing, with constant electromotive-force, depends upon the resistance, the amount of current flowing will indicate, when the devices are properly connected with measuring instruments properly calibrated, variations in the temperature of the conductor, and hence variations in the temperature of the hot gases surrounding the conductors. Such variations may be indicated by various current measuring devices. It is to be understood, however, that, although I use in this particular instance, this form of apparatus, yet any suitable form of apparatus may be applied; and in the application to various heat utilizing systems it is evident that various other forms of heat or temperature measuring devices may be preferable.

Inasmuch as I desire to know the ratio of the temperatures at two points, rather than the actual temperature at either of the two points, I use apparatus which indicates such a ratio and does not necessarily determine the actual temperature at either of the two points. Although various other forms of indicating devices may be used yet in this particular instance I have preferred for the purpose what is known as the ordinary Wheatstone bridge, with a heat susceptible member, such as the resistance changing member of an electrical resistance pyrometer, connected properly in series with each of two adjacent arms of such a bridge. By these means variations in the ratios of the resistances of the electric conductors of the heat susceptible members, and hence variations in the ratios of the temperatures of the conductors and the adjacent gases, will be indicated by a galvanometer properly connected to the bridge.

In the drawings, 1 indicates the firebox of the boiler. The hot gases generated in the firebox, by the combustion of fuel, pass into the chamber 2 beneath the boiler tubes 3. The gases then pass into the combustion chamber 4; thence through the passageway 5 between the baffle plates 6 and 7 and upward into the passageway 8 beneath the drum of the boiler; then downward through the upper set of tubes beneath the baffle plate 9 and into uptake chamber 10, and finally through the chimney inlet 11. The fire-end 12 of the apparatus is, in this instance, located in such a position as to be affected by the heat of the gases as they pass into the tube passageway and for convenience I call this the furnace fire-end. The fire-end 13 is located so as to be affected by the gases as they finally pass away from the tubes, and for convenience I call this the uptake fire-end. In these positions the respective fire-ends are affected by the initial and final temperatures of the gases so far as the effect of the gases on the water tubes is concerned. Slight variations in the positions of the fire-ends, however, are immaterial. It is not essential even that the fire-ends should be in the gas passageway; they may be in the passageway and protected by any suitable covering or they may be located entirely outside of the passageway, but adjacent thereto so that they may be affected sufficiently by variations in the temperatures of the gases.

Referring to Fig. 2, it will be seen that the system in this instance, in addition to the fire-ends 12 and 13, comprises an electric current producing apparatus 14, and the Wheatstone bridge 15. I wish it to be understood, however, that other forms of electrical indicating apparatus, of the nature of electric balances, may be used.

The current producing apparatus may be of any suitable form. In this instance, however, I have shown a generator 16, with connecting wires 17 and 18 running to the corners 19 and 20, of the bridge. In series with one of the wires may be placed, if desired, a lamp 21, or any other suitable resistance, in order to decrease the amount of current flowing. The wire 18 may be connected to the wire 17 by means of a conductor 22 in series with a rheostat 23. As this line is in parallel with the bridge, it is adapted, by means of the rheostat, to reduce still more the flow of current through the bridge.

The bridge 15, comprises the arms 24, 25, 26, and 27. In each of the arms, a variable resistance 28, 29, 30, or 31 may be placed, if desired, in order to suitably adjust the relative resistances of the various arms and for the reasons hereinafter specified. The fire-end 12 is connected in series with the arm 26 by means of the wires 32, and the fire-end 13 is connected in series with the arm 27 by means of the wires 33.

The fire-ends may be constructed in any suitable manner. In this instance I have chosen for the heat susceptible electric conductors the wires 34 which may be made of any suitable metal which is not injuriously affected by the action of high temperatures when out of contact with the fuel gases, for example, platinum. In order that changes in temperature of these wires shall affect the system as much as possible, the wires should be of comparatively small cross-section and as long as is practicable, while the connecting wires, 32 and 33, should be of comparatively large cross section, so as to offer but little resistance to the flow of electricity.

Any suitable means may be used for protecting the platinum wires. Herein I have indicated the means fully shown and described in my co-pending application Serial No. 736,073 hereinabove referred to, of which this application is a division, and to which reference may be had for a more detailed consideration of the construction of the fire-ends.

The corners 44 and 45 of the bridge are connected, by means of wires, 46, to the galvanometer 47. A line 48 may be placed in parallel with the galvanometer so that, by means of the rheostat 49, the current flowing through the galvanometer may be varied. Also, if desired, a recording apparatus 50 may be operatively connected with the galvanometer by means of the wires 51.

The operation of the apparatus is as follows: As is well known, with a Wheatstone bridge arranged as indicated in Fig. 2, so long as the ratio of the resistances of two adjacent arms is equal to the corresponding ratio of the resistances of the other two arms, there will be no current flowing through the galvanometer. But, if, for any reason, the resistance of any of the arms changes, so that this proportion no longer holds true, current will flow through the galvanometer. If now the pyrometer fire-ends in the passageway, as indicated, are heated normally by the hot gases, and the variable resistances in some of the arms are adjusted so that no current, or any desired current, flows through the galvanometer, any variation in the ratio of the temperatures at the points where the fire-ends are located will vary correspondingly the ratio of the resistances of the arms 26 and 27, and this will be indicated by the galvanometer, and thus will be indicated a variation in the ratio of the temperatures of the hot gases flowing through the passageway. Inasmuch as the temperature in the combustion chamber of a furnace is in the neighborhood of 2500 degrees Fahrenheit while the temperature in the uptake chamber is in the neighborhood of 500 degrees Fahrenheit, in order to have equal temperature ratios, in case of variations in the temperatures, it is necessary for the furnace temperature to vary substantially five times as much as the uptake temperature. But, to indicate equal temperature ratios with the Wheatstone bridge, it is necessary for the ratios between the resistances of the branches to be equal. Hence, a rise in temperature in the uptake should increase the resistance of the uptake branch of the bridge five times as much as a like rise in temperature in the furnace increases the resistance of the furnace branch in order that the ratio of the branch resistances shall be unchanged as long as the ratio of the temperatures remains unchanged. To produce this result the resistances 30 and 31 are suitably arranged. Although in practice other changes in these resistances are made to compensate for other features, as is hereinafter explained, yet, so far as this particular feature is concerned, the arrangement of the resistances is as follows: Assuming the resistances of the fire-ends to be alike, the resistance 30 in series with the fire-end 12 in the furnace should be substantially four times as great as the resistance of the wire in the fire-end; and the resistance 31 should be removed or short circuited. Assuming the resistance of the fire-end to be $x$ ohms we would then have the ratio between the resistances of the two arms equal to $$(x+4x)/x=5.$$

Assuming an increase in temperature of from 2000 to 2500 degrees in the furnace and from 400 to 500 degrees in the uptake chamber, and assuming, for the present, the temperature resistivity coefficient of platinum to be the same in the two cases and to equal $y$, we should have the ratio between the resistances of the two arms equal to $$(x+500xy+4x)/(x+100xy)$$

after the increase in temperatures, which also equals 5. Hence in the two cases the ratio of the resistances would be the same, and hence the indication of the instrument, as well as the temperature ratio, would be unchanged.

In general, to compensate for the differences in the average temperatures at the two places in the boiler, the resistance in the arm affected by the lower temperature may be removed, and the ratio between the total resistance in the other arm to the fire-end resistance is made equal to the ratio between the two average temperatures. However, it sometimes happens that it is desirable to compensate for the resistances of the wires connecting the operative portions of the fire-end wires with the Wheatstone bridge. For instance there may be a material length of the fine platinum wires of the fire-ends, or one of them, which is not affected by the temperature variations, and it may be desirable to correct for this. In such a case, it is necessary only to make the ratio of the total resistances of the branches equal to the ratio of the two average temperatures.

The differences of the temperature resistivity coefficients of platinum at different temperatures must be compensated for, or an error in this regard will enter. To compensate for this also it becomes necessary to readjust the resistances in series with the fire-ends. For simplicity we may first ignore the compensation hereinabove described for the differences in average temperatures in the two chambers. As the temperature of platinum increases, the temperature coefficient decreases; hence at high temperatures a change of one degree produces less change in resistance than at lower temperatures. We must therefore place in series with the low temperature fire-end a resistance to compensate for the variations in temperature coefficients. Assuming the ratio between the two coefficients to be 3, the effect of one degree temperature change in case of the hotter fire-end would be one third as great as in the case of the cooler fire-end. Hence to compensate for this the cooler fire-end would need a resistance placed in series therewith of such a magnitude that the ratio of the total resistance of the arm to the resistance of the fire-end would equal three. Or, in general, to allow also for other resistances in the branches, in order to compensate for the difference in temperature coefficients it is necessary merely to adjust the resistances of the branches so that the ratio between the total resistances is equal to the ratio between the temperature coefficients.

The fire-end 12 in this instance I have shown above the combustion chamber 4 among the water tubes of the boiler. Evidently the temperature of the flue gases in this portion of the passageway will be less than in the combustion chamber. Hence if it is desired to indicate the ratio of the temperature of the combustion chamber gases to the temperature of the uptake chamber gases, it will be necessary either to place the fire-end 12 in the combustion chamber or to make a correction for the lower temperature of the surrounding gas. For practical reasons it is frequently undesirable to place the fire-end in the combustion chamber, as the high temperature there may, at least in time, injure the fire-end.

To compensate for the cooler position of the fire-end 12, ignoring for the present all other corrections, it is necessary to have the lower temperature of the gas surrounding the fire-end 12 affect the bridge current as much as if the fire-end were placed in the combustion chamber. Hence to compensate for this alone I remove entirely the resistance 30 and adjust the resistance 31 so that the total resistance in the branch 27 is to the fire-end resistance as the temperature of the combustion chamber is to the temperature of the gas surrounding the fire-end 12. Or, in general, I adjust the resistances so that the ratio of the resistances of the branches equals the ratio of the two furnace temperatures.

The apparatus as above described gives results relating only to temperatures. In order to give results relating to amounts of heat any suitable means may be employed so as to vary the effect of the temperatures, upon the indicating apparatus, in proportion also to the specific heat and the masses of the gases. If for instance, the specific heat of the gases surrounding the fire-end 12 was twice that of the gases in the uptake chamber, in order to indicate the effects of the amounts of heat rather than the effects of the temperatures, it would be necessary for the fire-end associated with the gas having the higher specific heat to affect, proportionally, the indicator twice as much as the other heat susceptible device. In other words the effect due to one degree of temperature variation of the former device should be double that of the latter device. In order to bring about this result, it is necessary merely to adjust the resistances in their branches so that the ratio thereof will equal the inverse ratio of the specific heats affecting the respective branches.

Inasmuch as the mass of gas passing through the passageway of the boiler is ordinarily substantially unchanged in quantity, it is not usually necessary to correct for the amount of gases surrounding or passing the fire-ends. But, if for any reason it is desired to determine the heat ratio magnitude of the two gases per unit volume a similar adjustment is made. The ratio for instance of the density of the substances is determined in any suitable manner, and the resistances are adjusted inversely proportional to these densities.

If both the densities and the specific heats are to be simultaneously considered it is necessary only to adjust the resistances so that the ratio thereof is equal to the product of the inverse ratios of the densities and the specific heats of the substances involved.

In general, in order to compensate for any number of factors, affecting dissimilarly the branches of the indicating instrument, the ratio of the total resistances of the fire-end branches of the instrument should be made equal to the product of the ratios of the respective effects of the factors on the branches. This may be made clearer by considering the following set of conditions; and as a further factor affecting dissimilarly the branches of the instrument we may assume unlikeness in the resistances of the fire-ends 12 and 13.

Let
The ratio of the resistances of the fire-ends 12 and 13 be 9 to 1 or simply 9.
The ratio of the furnace and uptake temperatures 5.
The ratio of the two furnace temperatures 4/5.
The ratio of the temperature coefficients 1/3.
And the ratio of the specific heats 3/2.

As explained above the ratio of the specific heats should be inversely as the branch resistances; but each of the other ratios should be directly as the branch resistances. Hence the ratio of the branch resistances should be $$9 \times 5 \times 4/5 \times 1/3 \times 2/3 = 8.$$

Let
$x$ equal the resistance of the fire-end 13.
$y$ equal the remaining or external resistance of the branch 27.
$z$ equal the external resistance of the branch 26.
$a$ equal the temperature coefficient in the furnace.

Assuming an increase in temperature of the fire-end 13 of one degree, without changing the heat ratio we should require a rise in the fire-end 12 of 5 degrees to compensate for the difference in temperature in the furnace and the uptake; of only 4/5 of a degree to compensate for the difference in the furnace temperature, and of only 2/3 of a degree to compensate for the specific heats; or a rise of $$5 \times 4/5 \times 2/3 = 8/3 \text{ degrees}$$

to compensate for all of these factors. Then we should have before the rise as the ratio of the resistances in the branches $$(9x+z)/(x+y) = 8.$$

After a rise in the furnace of 8/3 degrees and of one degree in the uptake we should have $$(9x+z+9 \times 8/3 \times ax)/(x+y+3ax) = 8.$$

Hence while there would be no variation in the heat ratio there would also be no variation in the indications of the indicating instrument, as the ratio of the branch resistances would be unchanged.

In practice it is, of course, not necessary to make, in case of each installation, such mathematical determinations. Similar installations will require similar adjustments; and any suitable tests of the efficiency of the apparatus may be made either to obtain the required adjustments or to check up on the adjustments arrived at theoretically; and other errors than those hereinabove considered may be compensated for by adjusting the resistances in accordance with such theoretical determinations or tests, or in any other suitable manner.

Evidently the indicating scale adopted on the galvanometer may be varied to suit any desired conditions. It may be calibrated to read directly the actual efficiency or the actual heat-ratios in any particular instance. In either case, it is evident that the relative ratios due to varying conditions would be indicated. Or it may be calibrated so as to indicate relative ratios only.

With reference to these various matters, the following may be of value: The ordinary efficiency formula $$(h-h')/h,$$

where $h$ and $h'$ are the respective heat magnitudes, when expressed in terms of temperatures and specific heats, as hereinabove described, would be $$(ts-t's')/ts,$$

where $t$ and $t'$ are the respective temperatures $s$ and $s'$ are the respective specific heats. Or, if the actual heat magnitudes in any particular instance, for any reason, are desired, the formula would become $$(tsm-t's'm')/tsm,$$

where $m$ and $m'$ are the respective masses. Now, for simplicity, using the former formula we have $$(h-h')/h \text{ equals } 1-h'/h.$$

Evidently, therefore, the simple ratio $h'/h$ answers every purpose of the differential ratio, because, as the simple ratio decreases the differential ratio will increase; and as the pointer of the galvanometer passes in one direction to indicate a decrease in the simple ratio, which is the actual ratio that affects the apparatus, it would at the same time indicate an increase in the differential ratio, and hence an increase in efficiency.

By this apparatus therefore it is evident that efficiency, or other heat ratios, may be actually determined or they may be compared; and that such ratios may be either simple temperature ratios or heat magnitude ratios, and this is true whether or not the masses or the specific heats of the substances are equal. It is to be understood, however, that the invention is not limited in its application to furnaces and boilers or to any particular apparatus or substances or art; but the invention may be applied wherever it is desired to determine or compare temperatures or heat magnitudes with reference to any substances or objects located or used in the same or in different devices or apparatuses, and whether the substances or objects are adjacent to or remote from each other; and various modifications and changes in the apparatus for carrying out the invention may be made by those skilled in the art without departing from the spirit of the invention as disclosed by the following claims.

I claim as my invention—

1. The combination of a furnace with a plurality of heat susceptible electric conductors, positioned a material distance apart along the hot gas passages of said furnace, means for indicating simultaneous relative resistances of two of the conductors, and means electrically connecting said conductors to said former means.

2. The combination of a furnace with a plurality of heat susceptible electric conductors, positioned a material distance apart along the hot gas passages of said furnace, means for indicating simultaneous relative resistances, means electrically connecting said conductors to said means, and a resistance in series with one of said conductors.

3. The combination of a furnace and an efficiency indicating apparatus, said apparatus comprising two heat susceptible electric conductors positioned in the hot gas a material distance apart along the heat interchanging passageway of said furnace; a Wheatstone bridge, and wires connecting each of said conductors respectively with two adjacent arms of said bridge.

4. An efficiency-indicating apparatus comprising a Wheatstone bridge, heat-susceptible electric conductors electrically connected respectively with two adjacent arms of said bridge, said conductors being placed in the hot gas passageway of a furnace, means for varying the current flowing through said apparatus, and means for adjusting the amount of current flowing through the bridge of said Wheatstone bridge.

5. The combination of a furnace with a plurality of heat susceptible electric conductors positioned a material distance apart along the hot gas passages of said furnace, means for recording variations in the ratios of the temperatures of said conductors, and means electrically connecting said conductors to said recording means.

6. The combination of a furnace and an efficiency-indicating apparatus, said apparatus comprising a Wheatstone bridge; heat-susceptible electric conductors electrically connected respectively in two adjacent arms of said bridge, said conductors being located in different portions of the hot gas passageway of said furnace; and a recording galvanometer in the bridge line of said Wheatstone bridge.

7. The combination of a heat utilizing apparatus and an efficiency-indicating apparatus; said latter apparatus comprising a plurality of heat-susceptible devices positioned in various parts of the former apparatus, and means controlled by the heat susceptible devices for directly indicating ratios of the temperatures of said devices.

8. An efficiency indicating apparatus comprising a plurality of heat susceptible devices, and means controlled by said devices for indicating automatically and continuously the ratio of the temperatures of said devices.

9. An efficiency indicating apparatus comprising a plurality of heat susceptible devices, means operatively connected with said devices for indicating variations in the ratios of the temperatures of said devices, and means for varying the indications of said indicating means in accordance with the relative temperatures of said devices.

10. The combination of means for indicating continuously variations in the relative temperatures of a plurality of substances, and means for varying the indications of said indicating means in accordance with the relative specific heats of said substances.

11. The combination of a furnace; heat susceptible electric conductors positioned at different points along the hot gas passageway of said furnace; a relative resistance indicating apparatus; an electric circuit connecting each of said conductors with said apparatus; and a resistance placed in one of said circuits.

12. The combination of a boiler; two electric conductors placed at a distance from each other along the hot gas passageway of said boiler; wires connecting each of said conductors with a branch of a Wheatstone bridge; the ratio of the total resistances of said branches being substantially equal to the product of the ratio of the temperatures of the gases surrounding said devices the ratio of the temperature coefficients of the conductors and the inverse ratio of the specific heats of the gases surrounding the conductors.

13. The combination of a furnace; means for indicating the relative temperatures of the hot gases as they pass different points along the hot gas passageway of said furnace; and means for compensating the indications according to the relative specific heats and the relative temperatures of the gases at the said points.

14. The combination of a boiler; electric conductors placed at different points along the hot gas passageway of said boiler; an electric balance for indicating relative resistances; wires operatively connecting each of said conductors to said balance; and means for varying the indications of said balance in accordance with the relative specific heats of the gases surrounding said conductors.

15. The combination of a boiler and efficiency indicating apparatus, said apparatus comprising a plurality of heat susceptible electric conductors positioned along the hot gas passageways of said boiler, means for indicating automatically and continuously the ratios of the temperatures of said conductors, and means operatively connecting said conductors with the said indicating means.

In testimony whereof, I hereunto set my hand.

IRVEN H. WILSEY.